(12) United States Patent
Fisher et al.

(10) Patent No.: US 8,419,236 B2
(45) Date of Patent: Apr. 16, 2013

(54) LIGHT BOXES WITH UNIFORM LIGHT DISTRIBUTION

(75) Inventors: Kevin L. Fisher, Erda, UT (US); Mark Howard Raissen, Costa Mesa, CA (US); Esteban D. Hernandez, West Jordan, UT (US); Guillaume Martin, Rochetoirin (FR); Michael Damen, Rochetoirin (FR); Brian Hillstrom, Loretto, MN (US)

(73) Assignee: 3form, Inc., Salt Lake City, UT (US)

( * ) Notice: Subject to any disclaimer, the term of this patent is extended or adjusted under 35 U.S.C. 154(b) by 0 days.

(21) Appl. No.: 13/262,206

(22) PCT Filed: Mar. 29, 2010

(86) PCT No.: PCT/US2010/029086
§ 371 (c)(1),
(2), (4) Date: Oct. 11, 2011

(87) PCT Pub. No.: WO2010/117734
PCT Pub. Date: Oct. 14, 2010

(65) Prior Publication Data
US 2012/0020112 A1    Jan. 26, 2012

Related U.S. Application Data

(63) Continuation-in-part of application No. 29/355,551, filed on Feb. 9, 2010, now Pat. No. Des. 666,757, which is a continuation-in-part of application No. 29/355,552, filed on Feb. 9, 2010, now Pat. No. Des. 676,587.

(60) Provisional application No. 61/164,617, filed on Mar. 30, 2009, provisional application No. 61/263,322, filed on Nov. 20, 2009.

(51) Int. Cl.
*F21S 13/10* (2006.01)
*F21V 15/00* (2006.01)

(52) U.S. Cl.
USPC .............. 362/367; 362/249.02; 362/311.02; 362/612; 362/800

(58) Field of Classification Search ............. 362/23–30, 362/97.1, 97.4, 249.02, 311.02, 367, 800, 362/612
See application file for complete search history.

(56) References Cited

U.S. PATENT DOCUMENTS

| 6,976,779 B2 * | 12/2005 | Ohtsuki et al. ............... 362/608 |
| 7,229,198 B2 * | 6/2007 | Sakai et al. ................... 362/560 |
| 7,311,423 B2 * | 12/2007 | Frecska et al. ................ 362/372 |
| 2009/0073721 A1 | 3/2009 | Kamikatano et al. | |

FOREIGN PATENT DOCUMENTS

| JP | 2000047610 | 2/2000 |
| KR | 20070031355 | 3/2007 |
| KR | 20070076790 | 7/2007 |
| KR | 20090007445 | 1/2009 |

OTHER PUBLICATIONS

KIPO, International Search Report and Written Opinion for PCT/US2010/029086, Nov. 11, 2010, 9 pages.

* cited by examiner

*Primary Examiner* — Jason Moon Han
(74) *Attorney, Agent, or Firm* — Workman Nydegger

(57) ABSTRACT

Light boxes for uniformly illuminating panels include a frame that supports one or more translucent panels. The light boxes further include a light source positioned within the light box. Example light sources can include fluorescent bulbs, incandescent lights, and/or light-emitting-diodes. In at least one implementation, a manufacturer positions a relatively limited number of light sources aimed and/or positioned in a particular way to uniformly distribute light throughout the light box and evenly across the translucent panels such that there are no shadows, hot spots or other non-uniform light patterns on the translucent panels.

14 Claims, 9 Drawing Sheets

LIGHT BOXES WITH UNIFORM LIGHT DISTRIBUTION

CROSS-REFERENCE TO RELATED APPLICATIONS

The present application is a 371 U.S. National Stage of PCT Application No. PCT/US2010/029086, filed Mar. 29, 2010 entitled "LIGHT BOXES WITH UNIFORM LIGHT DISTRIBUTION," which claims the benefit of priority to the U.S. Provisional Application No. 61/164,617, filed Mar. 30, 2009, entitled "Reconfigurable LED Light Boxes;" and U.S. Provisional Application No. 61/263,322, filed Nov. 20, 2009, entitled "Light Boxes with Uniform Light Distribution;" U.S. Design application 29/355,551 filed Feb. 9, 2010, entitled "Light Box Wrap." The present application is also a continuation-in-part application of U.S. Design application 29/355,552 filed Feb. 9, 2010, entitled "Desk Front Light Box." The entire content of the above-mentioned patent applications are incorporated in their entirety herein by reference.

BACKGROUND OF THE INVENTION

1. The Field of the Invention

This invention relates to systems, methods, and apparatus for mounting, displaying, and/or lighting panels.

2. Background and Relevant Art

Light boxes are often used to display signs or advertising. Conventional light boxes include a box-like housing that a manufacturer/designer may secure to a wall or floor, for example. The housing can include a light source and illuminates the display from behind. The back-lighted display often includes a translucent plastic sheet upon which advertising or other notices are positioned. By back lighting the display, the light box increases the notice-ability and aesthetic appeal of the display, especially when the display is located in a dimly lit area.

In addition to using light boxes to display advertising or informational signs, designers and architects have begun using light boxes to display decorative panels. In particular, designers and architects may sometimes add to the functional and/or aesthetic characteristics of a structure by mounting or displaying decorative architectural panels as part of a light box. For example, decorative panels provide designers and architects with a virtually endless array of options in terms of improving or otherwise changing the aesthetics of a structure. Specifically, the manufacturer/designer can modify the color and texture of a given structure simply by modifying these features in the decorative panels secured to the given structure. Mounting decorative panels within light boxes can further increase the appeal of the structure by magnifying the color, transparency, and other aesthetic features of the decorative panels.

In general, panels used within light boxes comprise of a wide range of different materials. For example, panels can be made of any number of naturally or synthetically occurring metallic, glass, or resin-based materials, such as polyvinyl chloride or "PVC"; polyacrylate materials such as poly (methyl methacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol), or "PETG"; glycol modified polycyclohexylenedimethlene terephthalate, or "PCTG"; as well as polycarbonate, or "PC", materials, and combinations thereof. More recently, resin-based panels have become more popular due to their relative flexibility, relative light weight, and relative ease by which resins can be modified at comparatively low cost. Resin-based panels can also provide more flexibility when compared with glass or other conventional panels, at least in terms of color, degree of texture, gauge, and impact resistance. Additionally, resin-based panels may provide certain advantages in terms of recycling and reuse.

Notwithstanding the various materials that may be used as panels in light boxes, conventional light boxes may also include various possible light sources. For example, conventional light boxes may include incandescent lights, fluorescent lights, or light-emitting-diodes ("LEDs"). While each type of light sources provides differing advantages, each light source also has limitations and drawbacks when used in a conventional light box application.

For example, no matter the type of light source used in a conventional light box, one goal may be to illuminate the panel, and graphics displayed thereon, if any, uniformly with uniform light distribution throughout the panel. With conventional light boxes, often times the light source produces hot spots and/or shadows (i.e., visible spots of greater light intensity or lower light intensity on the panel). For instance, a conventional light box using incandescent lights may produce hot spots on the panel that correspond with the position of the incandescent light bulbs within the light box. Thus, the resulting panel display appears blotchy and unappealing. Moreover, if words are displayed on the panel, then the words may become difficult to read due to the hot and cold spots produced by the light source.

LEDs may also produce a similar negative effect when used as the light source in conventional light boxes. In particular, LEDs typically produce individual directional light beams. Conventional light boxes tend to show the individual light beams for each LED, an effect that is known as scalloping. Scalloping generally causes the panel to appear striped, which is typically unappealing and lowers the aesthetic appearance of the light box.

Although hot spots, cold spots, and scalloping may occur at almost any location on a panel, a general problem location may be around the corners and edges of the light box. The edges and corners of conventional light boxes may receive poor light distribution due to position of the light source within the box, as well as the geometry of the light box itself. For example, providing an even light distribution throughout the light box may be difficult due to light box size restrictions put in place by the Americans with Disabilities Act (ADA). Generally speaking, the ADA requires that objects projecting from walls protrude no more than four inches into walks, halls, corridors, passageways, or aisles. Light boxes satisfying the low-profile requirement of the ADA, often do not allow for the uniform diffusion of light necessary for even light distribution throughout the light box, and particularly the edges and corners of the light box. Thus, low-profile light boxes often include visually displeasing hot spots, cold spots, and/or scalloping.

Accordingly, there are a number of disadvantages in conventional light boxes that can be addressed.

BRIEF SUMMARY OF THE INVENTION

Implementations of the present invention provide light boxes that evenly distribute light throughout the light box. In particular, implementations of the present invention include light boxes of various sizes and configurations that provide uniform light distribution and illumination across the light box panels.

In one example implementations, a uniformly illuminated light box that substantially eliminates hot spots, shadows, scalloping or other non-uniform light characteristics from the lighted panels includes a translucent panel that is coupled to the frame. The translucent panel has an outer surface and an inner surface, and a diffusion space is adjacent to the inner surface of the translucent panel. A light source is positioned within the light box and is operatively associated with an optical lens such that light emitted from the light source is uniformly distributed throughout the diffusion space and across the translucent panel.

In a further implementation, a reconfigurable light box is configured to allow a manufacturer/designer to change the geometric dimensions of the light box depending on the application for which the manufacturer/designer desires to use the light box. The reconfigurable light box includes a frame having four wall portions, four corner portions, a first side and a second side. The reconfigurable light box further includes a back plate secured to the first side of the frame, and a translucent panel secured to the second side of the frame. A light source assembly mounted within at least a portion of the frame whereby the light source uniformly emits light across the translucent panel.

In another example implementation of the invention provides an illuminated piece of furniture that has a uniform light distribution. The illuminated piece of furniture includes a light box that forms a substantially hollow region surrounded by one or more translucent panels. The light box can include a light fixture positioned such that light emitted by the light source is directed towards the one or more translucent panels. Moreover, the light box can include an optical element associated with the light source such that the light emitted by the light source is directed through the optical element and diffused at a predetermined beam angle.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
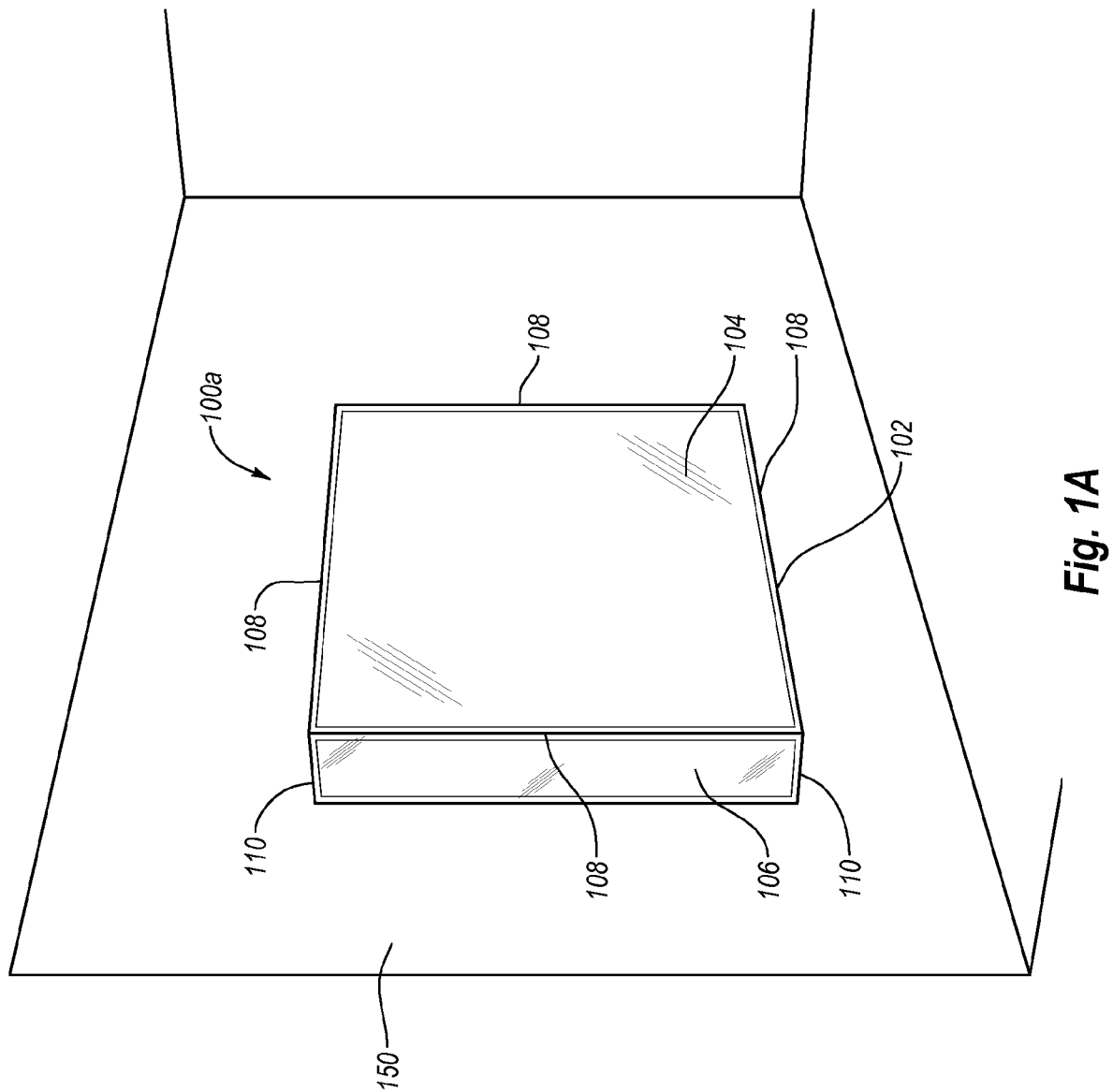
FIG. 1A illustrates a front-perspective view of a light box secured to a wall in accordance with one or more implementations of the present invention.

Implementations of the present invention provide light boxes that evenly distribute light throughout the light box. In particular, implementations of the present invention include light boxes of various sizes and configurations that provide uniform light distribution and illumination across the light box panels.

For example, implementations of the present invention provide light boxes with uniquely configured light sources that are positioned, arranged, and directed within the light box to provide uniform light distribution on the light box panels. For instance, one implementation of the present invention includes light boxes with a light source positioned and arranged to provide a uniform light distribution over the entire visible portion of the light box panel(s). For example, implementations of the present invention position LED fixtures proximate one or more edges of the light box and aim or direct the LEDs within the light box such that the light emitted from the individual LEDs is distributed uniformly across the panel(s) of the light box. In alternative implementations, the LED fixture(s) are mounted in one or more corners of the light box, or the LED fixtures are mounted within a middle portion of the light box.

In addition to the location and position of the light source within the light box, implementations of the invention further include one or more lenses that direct light in various directions such that the light source provides a uniform light distribution to the panels of the light box. For example, in one implementation, and LED light fixture includes multiple individual LEDs arranged substantially in a row with an alternating lens configuration that provides a light source capable of producing a uniform light distribution on the light box panels.

A further example implementation of the present invention includes a light box wherein the panels include a diffusion layer on the inner surface of the panels. The diffusion layer allows the light to pass through the panel to illuminate the panel, while at the same time reflecting at least a portion of the light back to the interior of the light box. The reflected light is then directed to other panels or portions of panels such that the net effect of the reflection is increased light distribution across each panel.

In addition to the above mentioned features, implementations of the present invention provide light boxes that have a lower cost as compared to some conventional light boxes. In particular, because the features and characteristics of the present invention allow for efficient uniform distribution of light throughout the light box, the present invention also provides a more energy efficient light box because less light sources are needed in order to uniformly illuminate the panels of the light box. Thus, implementations of the present invention not only provide a lower initial cost for a light box, but it also provides a lower "in-use" cost due to decreased energy requirements.

Moreover, because the number of light sources is smaller compared to conventional light boxes, implementations of the present invention further provide light boxes with unique dimensions and geometric configurations. In particular, implementations of the invention provide light boxes with relatively slim dimensions when compared to conventional light boxes. Furthermore, light boxes according to implementations of the invention can have various geometric configurations, while at the same time providing a uniform distribution of light on the light box panels.

FIGS. 1A through 1D illustrate various example configurations of light boxes according to one or more implementations of the present invention. As understood more fully herein, light boxes of the present invention can uniformly illuminate panels and substantially eliminate any hot spots, shadows, scalloping. For example, FIG. 1A illustrates a front perspective view of a light box 100a secured to a wall 150. As illustrated in FIG. 1A, a light box 100a can include a frame 102 within which a manufacturer/designer can couple a front panel 104.

As used herein, the term "panel" refers both to panels used to provide advertising or notices and to decorative panels. Thus, as the front panel 104 can include a substrate comprising materials of one or more layers or sheets formed from any one of the following resin-based materials (or alloys thereof). Specifically, such materials include but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like. Additionally, "panels" can also include non-resin based materials, such as those based partly on, or entirely formed from, glass, wood, or glass composites, marble, or other synthetic or natural materials that include a translucent property.

In addition to the various materials that a manufacturer/designer can use to make the front panel 104, the manufacturer/designer can further make the front panel 104 with various geometric dimensions from one implementation to the next. For example, the front panel 104 can vary in thickness to include a range from relatively thin gauge films to thicker gauge sheets (e.g., about one-thirty second inch ($\frac{1}{32}$") to about 5 inches (5")). For example, in some implementations, the gauge of the front panel 104 can be anywhere from about one-sixteenth inch ($\frac{1}{16}$") to about two inches (2") inches.

The thickness of the front panel 104 can be based at least partially on the desired translucency and the desired end-use of the front panel 104. For example, if a manufacturer/designer desires to use the light box 100a to display an advertisement or notice sign, the front panel 104 may comprise a thin, relatively inexpensive material. On the other hand, if the manufacturer/designer desires to use the light box 100a to add to or change the aesthetic of a design space using a decorative panel, the front panel 104 may be formed from a thicker resin-based material.

In addition to the front panel 104, the light box 100a can further include one or more side panels 106, as illustrated in FIG. 1A. The number of side panels 106 included on the light box 100a can vary from one implementation to the next. For example, FIG. 1A illustrates one implementations that includes 4 side panels 106, i.e., one side panel 106 on every side of the light box 100a. In alternative implementations, the light box 100a can include fewer or more side panels 106, depending on the geometric configuration of the light box 100a. For example, a triangular-shaped light box 100a can have three side panels 106, while a hexagonal-shaped light box 100a can have six side panels 106.

Moreover, there is no requirement that the light box 100a include side panels 106. In at least some implementations, the light box 100a does not include any side panels 106, but rather, the light box 100a can simply include side wall portions. A manufacturer/designer can position the side wall portions in substantially the same location as the side panels 106, but the side wall portions do not have the same characteristics as the side panels 106, such as transparency or translucency. In other words, a manufacture/designer can choose to employ the side wall portions to enclose the interior of the light box 100a, but not necessarily to provide an additional lighted aesthetic feature that the side panels 106 can provide.

As discussed above, the light box 100a can comprise a front panel 104, side panels 106 (or wall portions) secured within a frame 102. Generally, the frame secures the front panel 104 and side panels 106 in place to create the light box 100a structure, which in turn can be mounted to the wall 150. For example, and as illustrated in FIG. 1A, the frame 102 can comprise various edge sections 108 and four corner sections 110 forming a box-like shape. Moreover, the frame 102 can include a back plate 112 (see FIG. 2) that couples to and supports the corner sections 110 and the edge sections 108. The components of the frame 102 (i.e., the edge sections 108, the corner sections 110, and the back plate 112) can comprise a light-weight, durable material. For example, according to some implementations of the present invention, the frame 102 can comprise aluminum, or alloys thereof. According to additional implementations, the frame 102 can comprise fiberglass, wood, or other material that is light weight, strong, and provides an appropriate aesthetic.

In addition to various materials that a manufacture/designer can use to make the light box 100a, one will appreciate that a manufacturer/designer can build or design the light box 100a to be virtually any size. In particular, a manufacturer/designer can vary the overall width and length of the light box 100a. For example, light box 100a of the present invention can include relatively small light boxes that hold a front panel 104 having the size of about six inches by about six inches (6"×6"). Additionally, example implementations of the light box 100a can include relatively large light boxes 100a that hold a front panel 104 having the size of about 6 feet by about 15 feet (6'×15'). The light box 100a may be larger or smaller, depending on the particular light box application.

In addition to varying the overall width and length of the light box 100a, a manufacturer/designer can also vary the depth of the light box 100a. For example, the manufacturer/designer can vary the depth of the light box 100a by varying the dimensions of the side panels 106 (or wall portions), corner sections 110, gauge of the back plate 112, and/or the gauge of the front panel 104. In one example implementation, the light box 100*a* can have an overall thickness or depth of about four and a half inches (4.5"). However, the depth of the light box 100*a* can also range between about two inches (2") to about twenty-four inches (24"). One will appreciate, however, that a manufacturer/designer can build, design, or assemble a light box 100*a* of almost any thickness or depth. For instance, according to some implementations of the present invention, the reconfigurable light box 100*a* can have an overall thickness/depth of less than about four inches (4") (projecting from the wall) in order to comply with the low-profile requirements of the ADA.

Just as a manufacturer/designer can vary the geometric dimensions and overall size of the light box 100*a*, the manufacturer/designer can also vary the overall geometric configuration of the light box 100*a*. As illustrated in FIG. 1A, the light box 100*a* has a substantially square configuration. In alternative example implementations, the light box 100*a* can have virtually any geometric configuration. For example, the light box 100*a* can have a substantially rectangular, triangular, hexagonal, or circular geometric configuration.

Figure 1B:
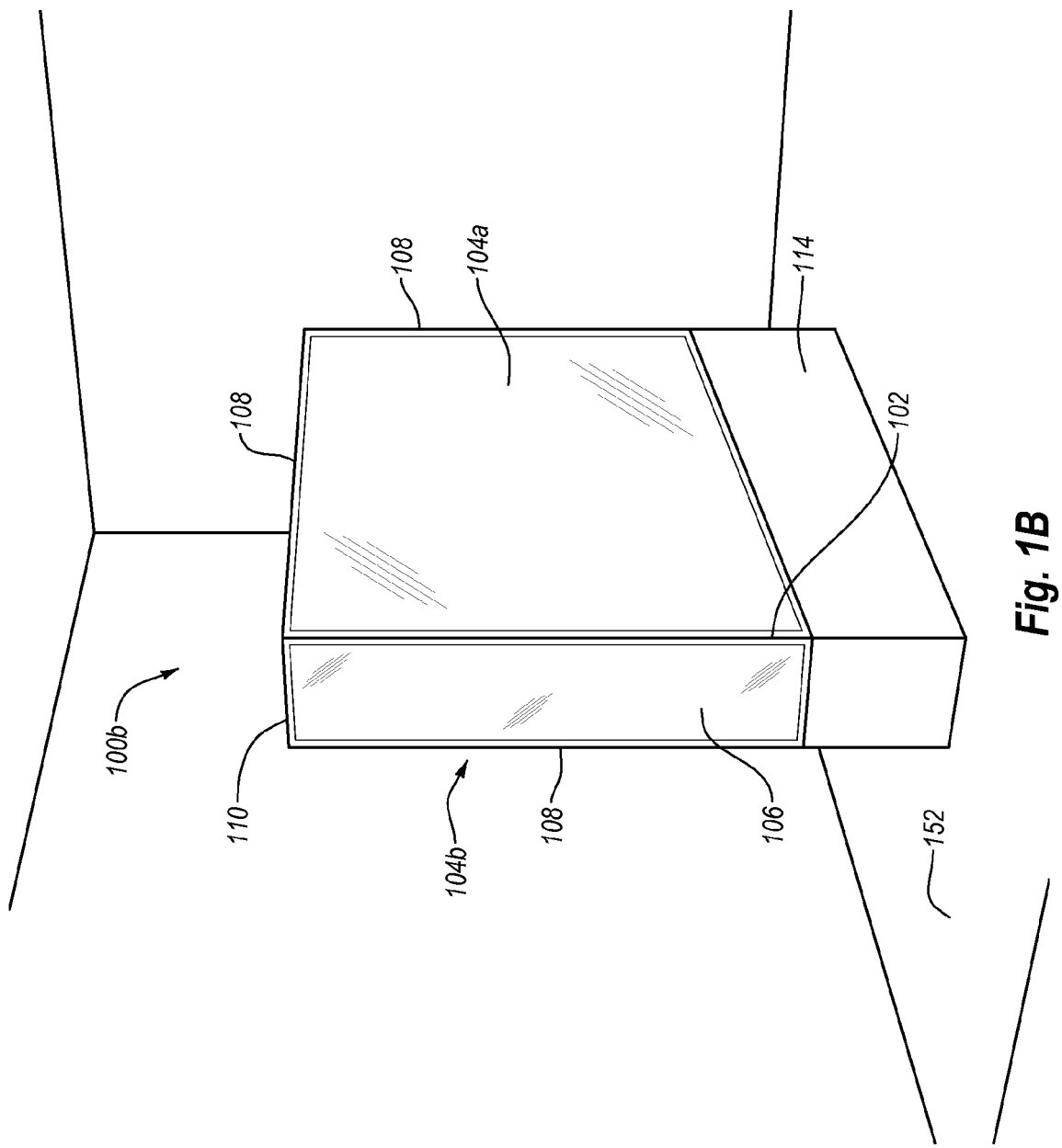
FIG. 1B illustrates a front-perspective view of a light box secured to a floor in accordance with one or more implementations of the present invention.

In addition to configuring the light box 100*a* to be mounted on the wall 150, as illustrated in FIG. 1A, a manufacturer/designer can also configure the light box 100*a* to be mounted or installed in various locations. For example, a manufacturer/designer can configure the light box 100*b* to be mounted to a floor 152, as illustrated in FIG. 1B. The light box 100*b* that is mounted to the floor 152 is similar to and can include the features, dimensions, and configurations of the light box 100*a* described above with reference to FIG. 1A.

In one example implementation, the light box 100*b* that is mounted to the floor 152 includes a frame 102 that secures a front panel 104*a* and side panels 106. In addition to having a front panel 104*a*, the light box 100*b* that is mounted to the floor 152 also can include a back panel 104*b* because the floor mount configuration allows both the front and back of the light box 100*b* to be visible.

As with the light box described with reference to FIG. 1A, the frame 102 of the light box 100*b* can include edge sections 108 and corner sections 110. In addition to the frame 102 and the frame components, the light box 100*b* can further include a base portion 114, as illustrated in FIG. 1B. A manufacturer/designer can design the base portion 114 to mount the light box 100*b* to the floor 152 and support the frame 102 and the panels (e.g., the front panel 104*a*, back panel 104*b*, and side panels 106). The base portion 114 can also house electrical components, as well as a light source (as described in more detail below).

Similar to the way in which the light box 100*b* is mounted to the floor 153, a manufacturer/designer can also mount the light box 100*b* on a ceiling, wall, or other support structure. For example, the base portion 114 can be mounted to a ceiling in the same or similar way in which the base portions 114 is mounted to the floor 152 in FIG. 1B. Depending on the size of the light box 100*b*, the base portion could also be mounted on a wall such that the light box 100*b* protrudes from the wall in a way that both the front panel 104*a* and the back panel 104*b* are visible.

Figure 1C:
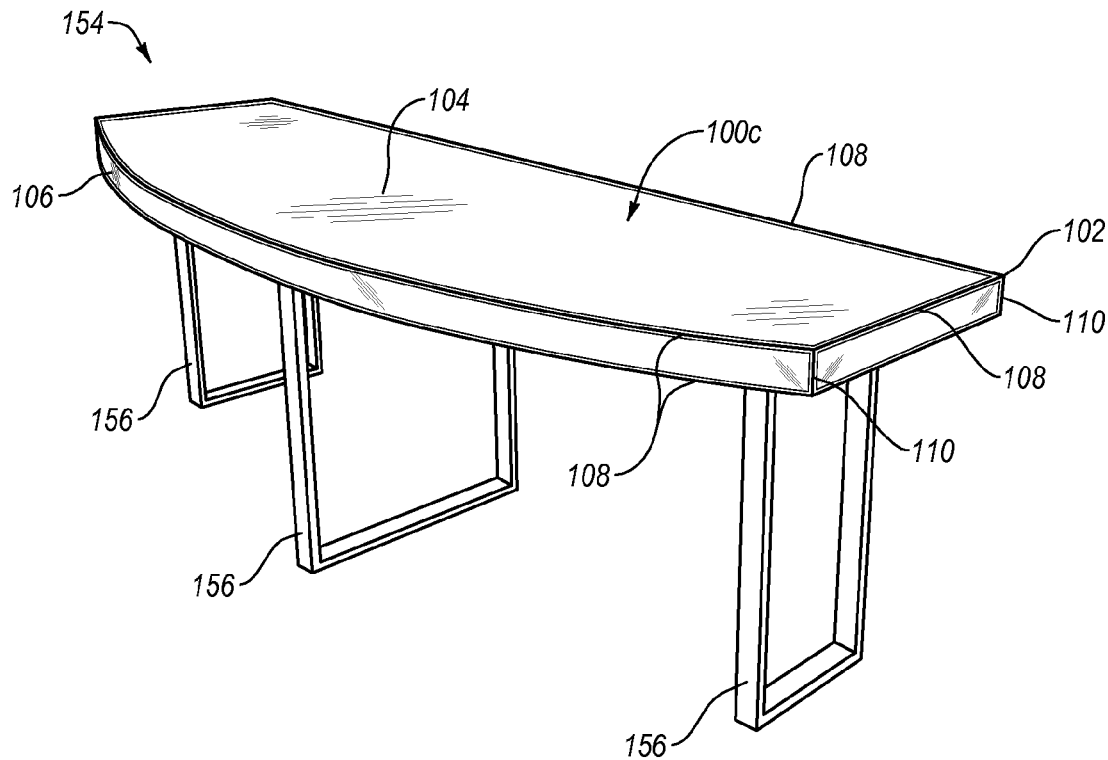
FIG. 1C illustrates a front-perspective view of a light box formed as part of a table in accordance with one or more implementations of the present invention.
Figure 1D:
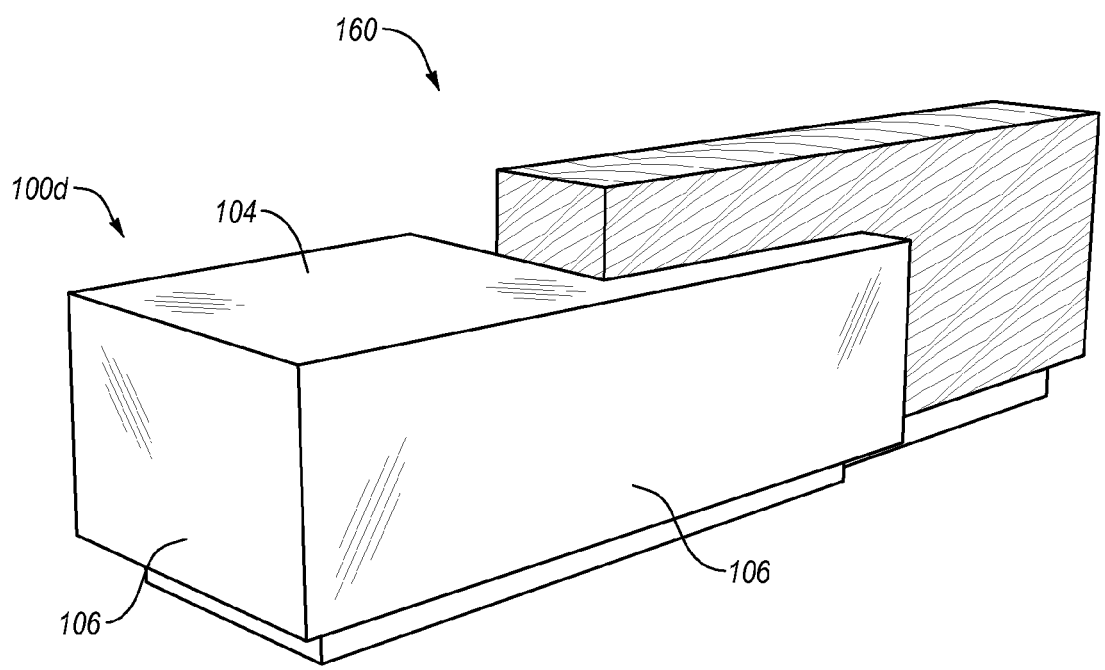
FIG. 1D illustrates a front-perspective view of a light box formed as part of a desk in accordance with one or more implementations of the present invention.

In addition to a manufacturer/designer mounting the light box 100*b* to support structures (e.g., walls, floors, or ceilings), a manufacturer/designer can incorporate the light box 100*b* into almost limitless forms. For example, FIGS. 1C and 1D illustrate example implementations wherein the light box 100*c* and 100*d* are incorporated into furniture. In particular, FIG. 1C illustrates a table 154 that incorporates the light box 100*c*. Although the table 154 can take various forms, the table illustrated in FIG. 1C includes three table legs 156 that support the light box 100*c*. The light box 100*c* then forms the table top portion of the table 154.

In alternative implementations, a manufacturer/designer can use the table legs 156 to simply support the light box 100*c* while adding an additional base system around the table legs 156 to provide a different aesthetic. In yet additional implementations, the light box 100*c* can be supported with legs, supports, blocks, or any other combination that produces a base system that supports the light box 100*c*.

As with the previous example implementations, described above with reference to FIGS. 1A and 1B, the light box 100*c* forming the table 154 includes a frame 102 with edge sections 108 and corner sections 110. The frame supports the front panel 104 and the side panels 106. In one implementation, the light box 100*c* is two inches (2") thick; however, the thickness can vary from one implementation to the next. Moreover, the light box 100*c* illustrated in FIG. 1C can also include the above described features, dimensions, and configurations as discussed above with reference to FIGS. 1A and 1B.

FIG. 1D illustrates another example implementation of the light box 100*d*. In particular, FIG. 1D illustrates the light box 100*d* forming a side portion of a desk 160, or other similar type of furniture. For example, the light box 100*d* illustrated in FIG. 1D includes a front panel 104, and two side panels 106 that are illuminated, providing a unique and aesthetically pleasing feature to the desk 160. A manufacturer/designer can also incorporate the light box 100*d* in other types of furniture and structures, and FIGS. 1A through 1D illustrate only a few examples in which the light box 100*d* is used to create various designs and structures. One will appreciate that a manufacturer/designer can create and use the light box 100*d* in almost limitless forms, sizes, and configurations.

Figure 2:
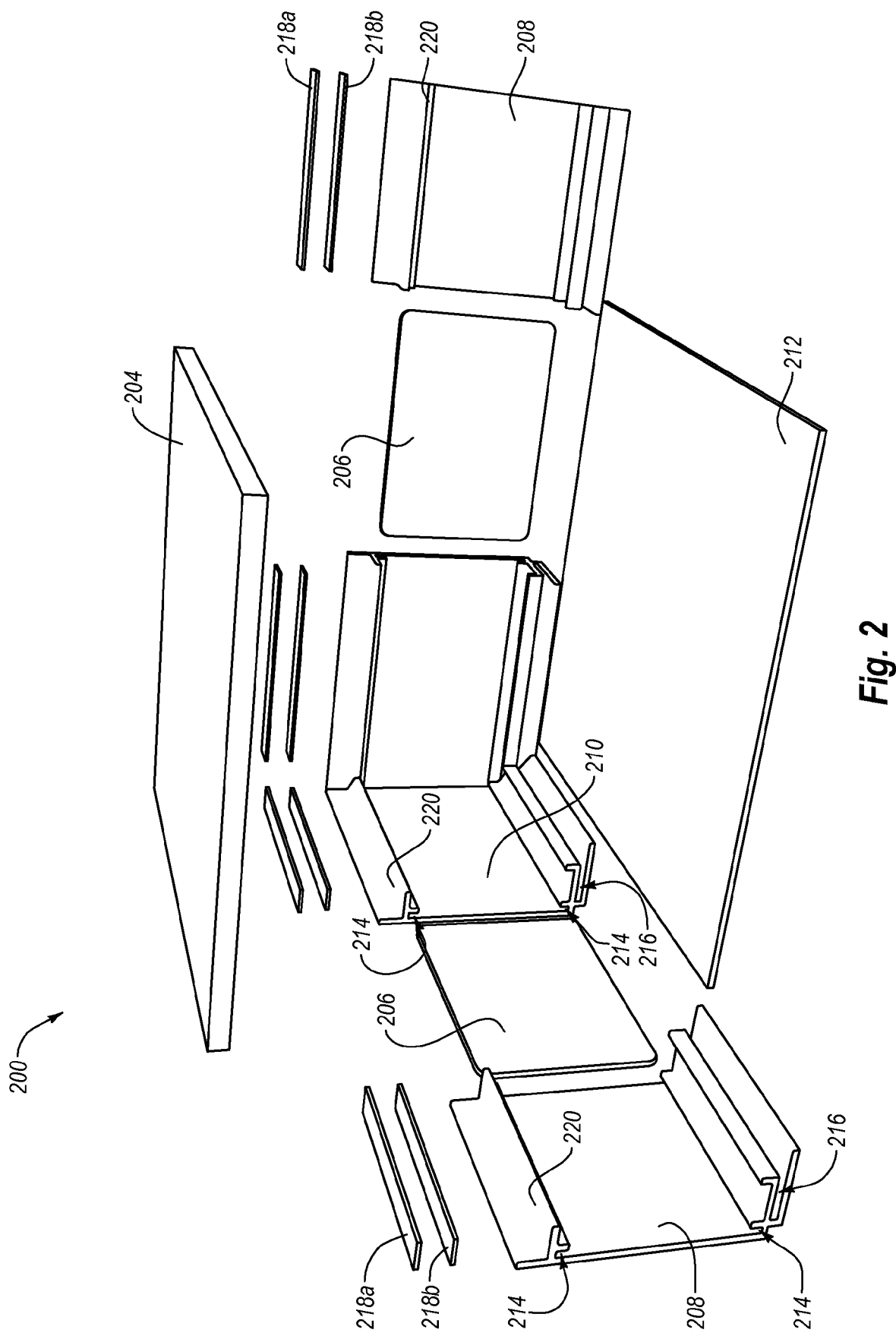
FIG. 2 illustrates an exploded view of a reconfigurable light box in accordance with one or more implementations of the present invention.

In addition to providing more permanent structures, as illustrated in FIGS. 1A through 1D, a manufacturer/designer can also make the light box to be reconfigurable such that an end user can change the size of the light box, color of the panels, or other characteristics onsite. For example, FIG. 2 illustrates an exploded perspective view of an example implementation of a reconfigurable light box 200. One will appreciate, however, that the particular implementations of the reconfigurable light box 200 illustrated in FIG. 2 are only exemplary, and variations thereof remain within the scope of the present invention. As with previously described light boxes above, the reconfigurable light box 200 can include a front panel 204, which can be formed from a translucent material, as described above.

The reconfigurable light box 204 further includes interconnecting elements that couple together to form a box-like frame around the front panel 204. The interconnecting elements can include side splices 206 that couple a corner portion 210 to a wall portion 208, as illustrated in FIG. 2. In particular, the wall portion 208 and the corner portion 210 can include a splice groove 214 wherein a manufacturer/designer can insert the side splice 206. In one example implementation, the splice groove 214 has a width that is slightly smaller than the thickness of the side splice 206 such that the side splice 206 is securely held in place in the splice groove 214 with a slip fit force. Alternatively, each side splice 206 can include a plurality of fasteners, which can secure each end of the side splice to the corner portion 210 or the wall portion 208. According to additional implementations of the present invention, the corner portions 210 and the wall portions 208 can include a snap-fit interface. Thus, at least a portion of each end of the corner section 130 can be configured to snap-fit within at least a portion of an end of a wall section 108, or vice-versa.

Just as the side splice 206 couples to the wall portion 208 and the corner portion 210 by way of a splice groove 214, the reconfigurable light box 204 can further include a back plate 212 that couples to the corner portion 210 and the wall portion 208 by way of a back plate groove 216, as illustrated in FIG. 2. Similar to the side splice groove 214, the back plate groove can have a width that is slightly smaller than the thickness of the back plate 212 such that the back plate 212 is securely held in place in the back plate groove 216 with a slip fit force. In additional implementations, the back plate 212 can include a plurality of fasteners, which can secure the back plate to the corner portion 210 or the wall portion 208. According to additional implementations of the present invention, the corner portions 210 and the wall portions 208 can include a snap-fit interface with the back plate 212.

When the side splice(s) 206, wall portion(s) 208, corner portion(s) 210 and back plate 212 are assembled and securely coupled together, as described above, a manufacturer/designer can couple the front panel 204 to the assembly, as illustrated in FIG. 2. For example, FIG. 2 illustrates that the wall portions 208 and the corner portions 210 can include a flange 220 to which a manufacturer/designer can secure the front panel 204. The flange 220 can extend generally perpendicularly away from the wall portion 208 and corner portion 210 and into the interior of the reconfigurable light box 200 to provide a mounting surface for the front panel 204. A manufacturer/designer can secure the front panel 204 to the flange 220 of the wall portion 208 via one or more fasteners 218a and 218b.

For example, FIG. 2 illustrates that a manufacturer/designer can secure the front panel 204 to the flange 220 using dual-lock fasteners 218a and 218b (e.g., hook and loop-style fasteners, such as VELCRO). A manufacturer/assembler can use dual-lock fasteners or adhesives to ensure that the complete surface area of the exposed side of the panel 104 does not include potentially visually displeasing hardware. Additionally, a manufacturer/assembler can use dual-lock fasteners or adhesives to ensure that the front panel 204 is not damaged by more invasive fasteners. Moreover, the dual-lock fasteners allow a manufacturer/designer to reconfigure the light box to various sizes of front panels 204. According to additional implementations of the present invention, other fasteners can be used to secure the front panel 204 to the assembly, such as for example, brackets, screws, or various adhesives.

One will appreciate in light of the disclosure herein, that the size of the reconfigurable light box 200 can be easily reconfigurable. In particular, a manufacturer/designer can vary the overall dimensions of the reconfigurable light box 200 by varying the length of the wall portions 208 secured between the corner portions 210, or by increasing the number of wall portions 208. A manufacturer/designer can, thus, alter the overall geometric configuration of the reconfigurable light box 200 by varying the lengths of the wall portions 208. In particular, a manufacturer/designer can form a substantially square geometric configuration, or alternatively, by increasing the lengths of two parallel wall portions 208, the manufacturer/designer can change the geometric configuration to a substantially rectangular configuration.

Figure 3:
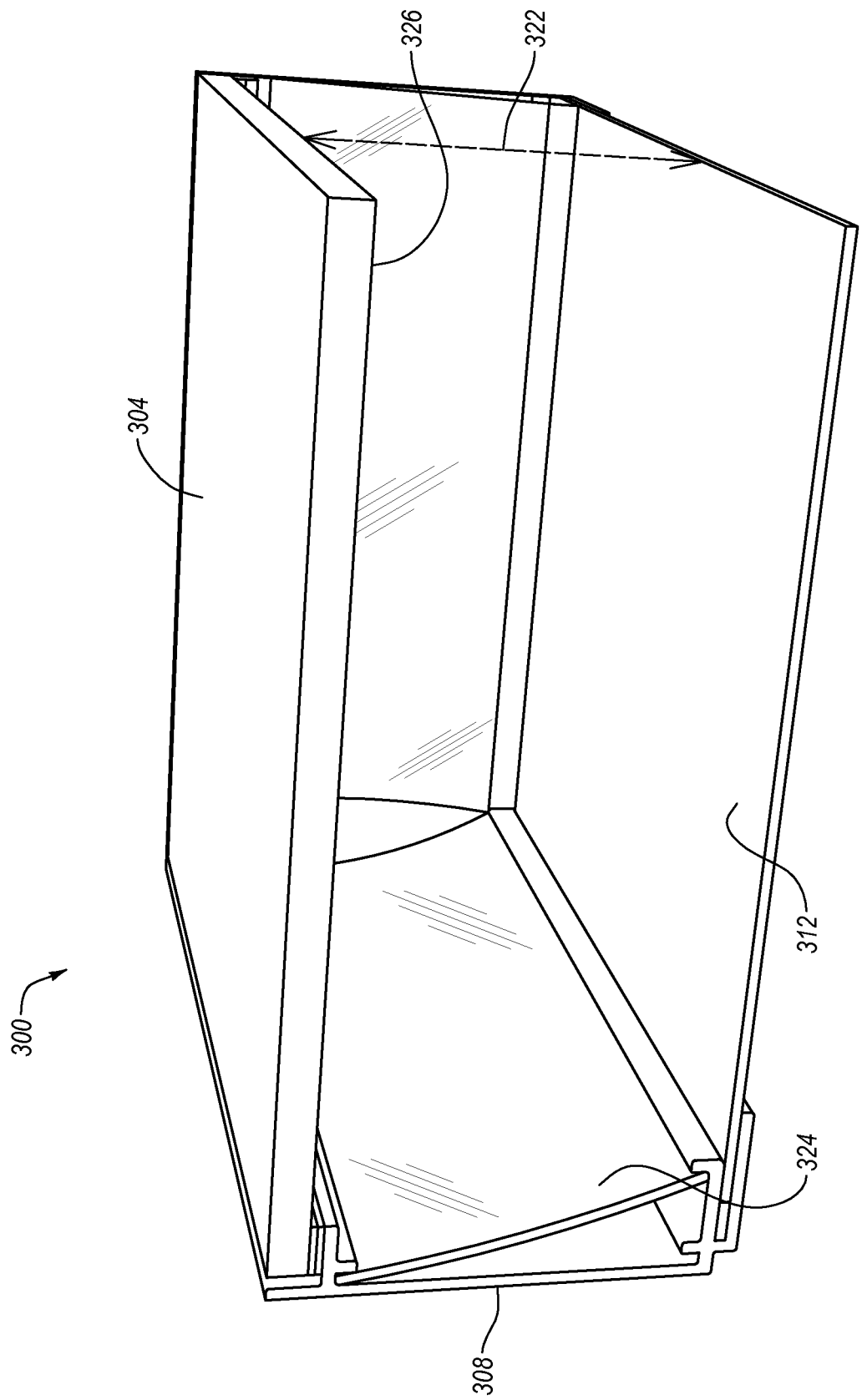
FIG. 3 illustrates an open end-view showing an example of the interior of a light box in accordance with one or more implementations of the present invention.

Notwithstanding whether or not the light box has a substantially permanent configuration (illustrated in FIGS. 1A through 1D) or a reconfigurable configuration (illustrated in FIG. 2) the light box can include several features and characteristics that promote even light distribution across the panel(s) of the light box. For example, and as illustrated in FIG. 3, the light box 300 can include a diffusion space 322 located between a front panel 304 and a back plate 312, for example. In other example implementations, the diffusion space 322 can comprise the space located between a front panel and a back panel.

A manufacturer/designer can configure the diffusion space 322 to allow light to evenly distribute throughout the light box 300 to provide uniform illumination of the front panel 304, for example. The diffusion space 322, as shown in FIG. 3, provides space for light to spread and evenly distribute throughout the light box 300. The depth of the diffusion space 322—or in other words, the distance at which the front panel 304 is offset from the back plate 312—can vary depending upon the desired overall size of the light box 300. According to some implementations of the present invention, the depth of the diffusion space 322 can be between about two inches (2") to about twenty four inches (24") depending on the overall size and configuration of the light box 300.

In order to provide even distribution of light within the diffusion space 322, example implementations of the present invention can include various components and characteristics to aid in light distribution. For example, the back plate 312 can act as a reflector to reflect light across the diffusion space 322 towards the front panel 304. Thus, the back plate 312 can comprise a material configured to reflect light. In one implementation, the back plate 322 can comprise an aluminum sheet painted white or other materials capable of reflecting light, such as for example, a mirror. A manufacturer/designer can also use other materials having the same or similar reflective properties to make the back plate 312.

In addition to reflective properties of the back plate 322, other example implementations of the light box 300 can further include side reflectors 324. In particular the side reflectors 324 can be positioned such that they are angled toward the front panel 304. As illustrated in FIG. 3, a manufacturer/designer can secure the side reflectors 324 into the sides of the light box 300 by way of prefabricated grooves and tabs. Alternatively, a manufacturer/designer can use other fasteners, such as screws, hook and loop, or other types of fasteners to secure the side reflectors 324 to the inner sides of the light box 300.

As with the back plate 312, the side reflectors 324 can include reflective surfaces to direct light towards the front panel 304 (or other translucent panels) and/or uniformly distribute light evenly throughout the diffusion space 322. Thus, the side reflector 324 can comprise an aluminum sheet painted white, for example, or other materials capable of reflecting light, such as for example, a mirror. A manufacturer/designer can also use other materials having the same or similar reflective properties to make the back plate 312.

In the event that the manufacturer/designer does not desire to use side reflectors 322, wall portions 308 can include reflective properties. In particular, the wall portion 308 material can comprise a light reflecting material configured to reflect light. For example, the wall portions 308 can comprise white melamine, which has a reflective property. In other example implementations, the wall portions 308 can comprise a material configured to reflect light or refract light, such as for example, a mirror. According to additional implementations, the wall portions 308 can comprise an aluminum sheet painted white, or can be formed from other materials capable of reflecting light.

Moreover, to further aid in the uniform distribution of light across the front panel 304 and throughout the diffusion space 322 of the light box 304, the inner surface 326 of the front panel 304 (i.e., the surface of the front panel 304 facing the back plate 312) can include a diffusion layer. The diffuser layer (or diffusion surface finish) can further assist in evenly distributing the light uniformly across the front panel 304 and throughout the diffusion space 322. For example, the front panel 304 can include a thin white translucent layer on the inner surface 326 of the front panel 304. A manufacturer/designer can use the white translucent layer (also known as a "Ghost" layer) to increase the reflective properties of the inner surface 326 of the front panel 304, while at the same time allowing light to pass through the front panel 304. The white translucent layer can be added to any "panel" section discussed herein, and can have a thickness of about one millimeter (1 mm).

In addition to the light diffusion characteristics discussed above, the light box includes one or more light sources that a manufacturer/designer can configure and position to provide a light source that allows for uniform distribution of light across all panels and throughout the light box. A manufacturer/designer can choose the type, location, and configuration of the light source depending on the size and configuration of the light box. For example, the type of light source can vary from one implementation to the next, as well as within the same implementation. Example types of light sources can include, but are not limited to, fluorescent light bulbs, incandescent light bulbs, and LEDs.

LEDs in particular can vary from one implementation to the next, depending on the overall size and configuration of the light box. For example, LEDs used in connection with implementations of the present invention include low-powered, medium-powered, high-powered, and super-high-powered LED lights. Generally, for purposes of this application, low powered LED lights are defined to have a power consumption of about four watts (4 W/ft) and a brightness of about one-hundred and thirty lumens per foot (130 lm/ft). Medium powered LED lights are defined to have a power consumption of about eight watts (8 W/ft) and a brightness of about one-hundred and forty-four lumens per foot (144 lm/ft). High powered LED lights are defined to have a power consumption of about twelve watts (12 W) and a brightness of about one-hundred and fifty-nine lumens per foot (159 lm/ft). Super high powered LED lights are defined to have a power consumption of about sixteen watts (16 W/ft) and a brightness of about one-hundred and seventy-two lumens per foot (172 lm/ft).

Figure 4:
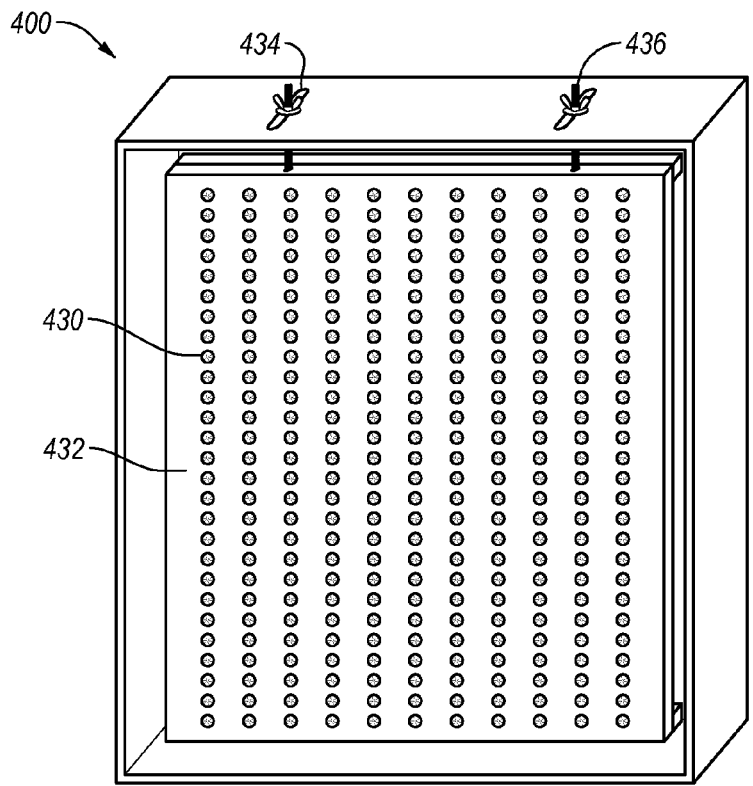
FIG. 4 illustrates an example light source located on a plate within an example light box.

Just as the type of light source can vary, so too can the location and configuration of the light source. For example, and as illustrated in FIG. 4, a manufacturer/designer can position a light source 430 within the light box 400 using a plate 432 that has substantially the same height and width of the interior of the light box 400. A manufacturer/designer can adjust the position of the plate 432 within the light box 400 by way of adjustment slots 434 and fasteners 436. A manufacturer/designer can position the plate 432 within the light box 400 such that the light source 430 that is mounted on the plate 432 directs light in the direction of the front panel.

In one example implementation, the light source 430 can be a series of fluorescent light rows equally spaced from the top of the plate 432 to the bottom of the plate 432. For example, in one implementation, the light box 400 can be about ninety six inches (96") tall, about forty four inches (44") wide, and about ten inches (10") deep. In this example, the fluorescent lights can comprise T4 fluorescent bulbs; however, in alternative implementations a manufacturer/designer can use a variety of sizes, types, wattages, etc. of fluorescent bulbs. When T4 fluorescent bulbs are used, for example, each fluorescent light bulb is spaced about eight inches (8") on center from the adjacent fluorescent light bulb, and about six inches (6") from the front panel. This configuration can provide uniform light distribution throughout the front panel.

Alternatively, a manufacturer/designer can use LED lights in a similar fashion, as illustrated in FIG. 4. For example, a manufacturer can mount a series of low-power LED light ribbons to the plate 432. When low-power LED lights are used as the light source 430, the light box 400 can have substantially the same dimensions as discussed in the preceding paragraph, with the exception that the light box 400 can have a smaller depth of about four inches (4") to about six inches (6"). Moreover, due to the differences between a LED and a fluorescent light source, a manufacturer/designer can arrange the low-power LED light ribbons such that each ribbon is spaced about four inches (4") on center from adjacent ribbons, and about four inches (4") away from the panel. This configuration can provide a uniform light distribution across the panel. Other configurations are possible depending on the size of the light box 400 and the type of light source 430 used.

A manufacturer/designer can use the plate 432 and light source 430 illustrated in FIG. 4, or substantially similar configurations, to provide a light source within various configurations of light boxes, such as those illustrated in FIGS. 1A through 1D. Of course, positioning the light source on the plate 432 is only one example of how a manufacturer/designer can position a light source within a light box.

Figure 5A:
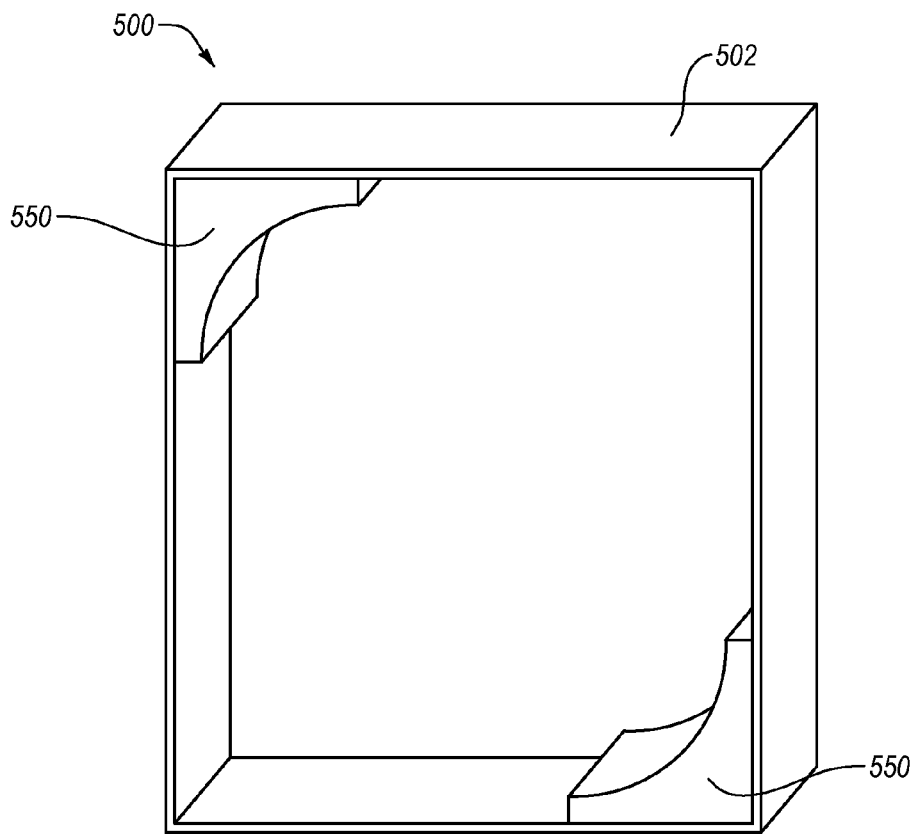
FIG. 5A illustrates a perspective view of an example light source located on a corner assembly within an example light box.

For example, FIG. 5A illustrates a cut-away view of another example implementation of a light box 500 that includes corner assemblies 550 that include a light source (discussed below). In particular, a manufacturer/designer can mount a corner assembly 550 in one or more corners of the light box 500. For example, and as illustrated in FIG. 5A, the light box 500 can include two corner assemblies 550 mounted to opposing corners of the substantially rectangular light box 500. Additionally the corner assemblies 550 can be mounted in other configurations, for example, the corner assemblies 550 may be mounted to corners that are located on the same side of a the light box 500. In alternative implementations, each corner of the light box 500 can include a corner assembly 500.

The corner assembly 550 can provide a light source that distributes light throughout light box 500 of varying sizes and dimensions. Thus, according to reconfigurable implementations of the present invention, a manufacturer/designer need not reconfigure the light source of the light box 500 for each size or dimension of light box 500. One will appreciate that this provides a manufacturer/designer with a great deal of versatility in creating and designing reconfigurable light boxes 500. In particular, because of the corner assemblies 550, a manufacturer/assembler can use the same parts and components to create reconfigurable light boxes 500 of varying sizes. Thus, a manufacturer/designer can use the same corner assemblies 550 to create light boxes 500 almost regardless of size and dimension.

Figure 5B:
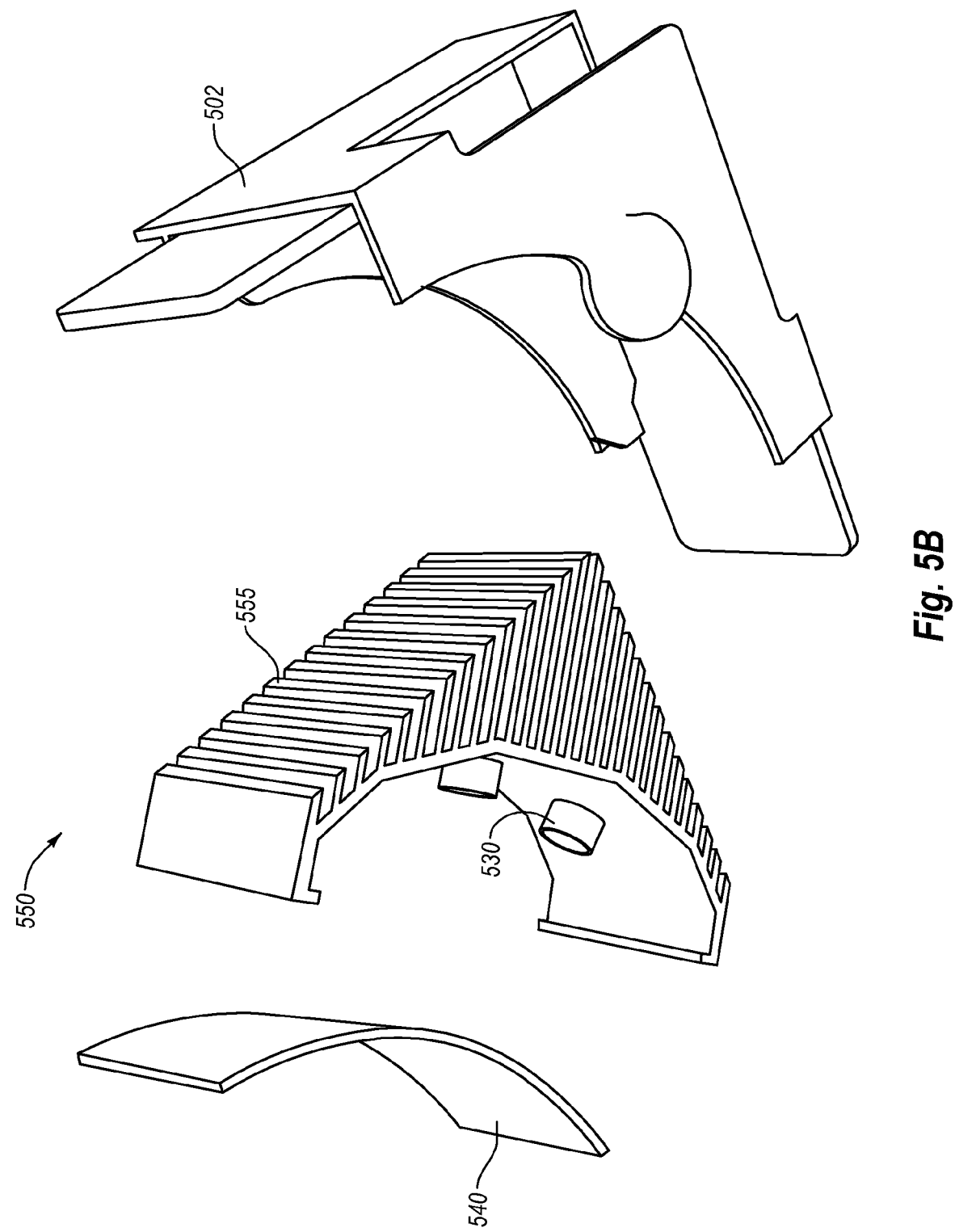
FIG. 5B illustrates an exploded view of an example corner assembly.

FIG. 5B illustrates an exploded, perspective view of an example implementation of the corner assembly 550, such as the one depicted in FIG. 5A. As illustrated in FIG. 5B, the corner assembly 550 can include a light source 530. For example, according to some implementations of the present invention, the light source 530 in the corner assembly 550 can include a plurality of LEDs, such as three LEDs. Of course, one will appreciate that the number of LEDs can vary from one implementation to the next according to the size and configuration of the light box 500. A manufacturer/designer can also use other types of light source 130 in the corner assembly 550, such as incandescent lights.

In addition to the light source 530, FIG. 5B shows that the corner assembly 550 can also include an optic lens 540. The optic lens 540 can help distribute/direct the light emitted from the light source 530 throughout the light box 500. In particular, the optic lens 540 can focus the light from the light source 530 into a narrow wedge of light. The narrow wedge of light created by the optic lens 540 in each corner assembly 550 can then further diffused and dispersed by the use of a back plate, side reflectors, and the diffuser layer on panels, as discussed in detail above. Thus, the light source 530 can evenly distribute light throughout the light box 500 and across the panel(s) to help ensure that hot spots, shadows, and the location of the light source are substantially not visible.

In addition to assisting to provide an even distribution of light, the optic lens 540 can, in some cases, decrease the number of light sources 530 needed. In one implementation, for example, a manufacturer/designer can use a smaller number of LEDs when using the LEDs in combination with the optic lens 540. The use of a smaller number of LEDs can decrease the overall cost of the light box 500 and reduce the power requirements to run the light box 500.

Regardless of the number of LEDs used in the corner assembly 550, a manufacturer/designer can position and aim each LED to provide optimal light dispersion. For example, according to some implementations of the present invention, a manufacturer/designer can position and angle each LED relative to the other LEDs of the corner assembly 550 to increase light dispersion, depending upon the overall dimensions of the light box 500. According to yet further implementations of the present invention, a manufacturer/designer can position the LEDs at specific optimal relative angles regardless of the overall dimensions of the light box 500.

A manufacturer/designer can use the corner assembly illustrated in FIGS. 5A and 5B, or similar assemblies, to provide a light source within various configurations of light boxes, such as those illustrated in FIGS. 1A through 1D.

Figure 6:
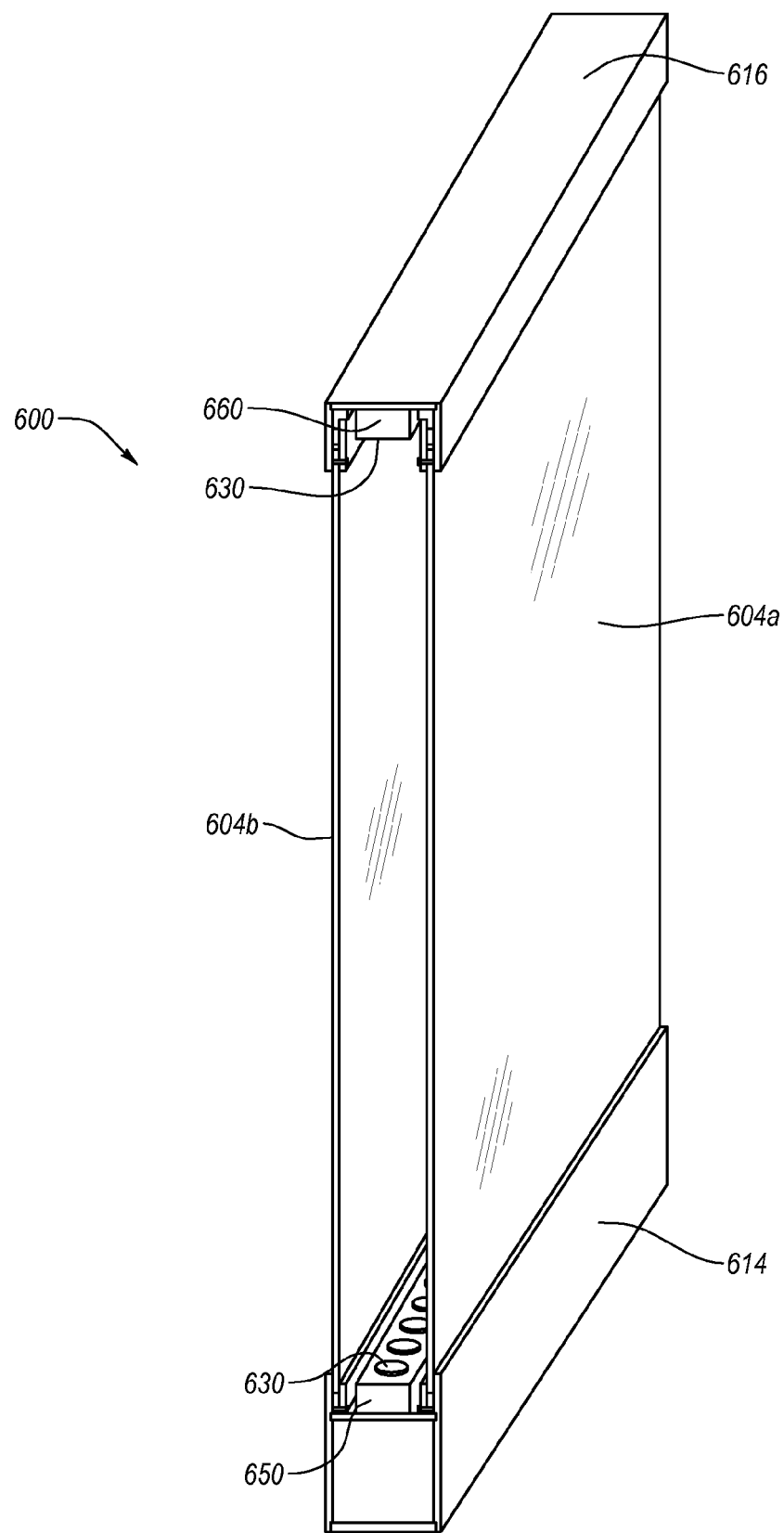
FIG. 6 illustrates a side-perspective view of an example light box with light sources located at the top and bottom of the light box.

In addition to positioning the light source on a plate or in a corner assembly, as described above, a manufacture/designer can also position the light source in one or more ends of a light box, as illustrated in FIG. 6. In particular, FIG. 6 illustrates an example light box 600 that includes a front panel 604a and a back panel 604b supported by a base portion 614. The front panel 604a and the back panel 604b are additionally stabilized by a top portion 616. The light box 600 can further include a bottom light fixture 650 located within the base portion 614 of the light box 600. The bottom light fixture 650 includes one or more light sources 630.

In one implementation, the light source 630 includes a plurality of high power LEDs. For example, FIG. 6 shows that the light source 630 can be located within the base portion 614, and can be positioned such that light from the light source 630 is directed throughout the light box 600 to allow both the front panel 604a and the back panel 604b to have a uniform light distribution. In one example implementation, the light source 630 can be centered between the front panel 604a and the back panel 604b.

The position of the light source 630 can vary from one implementation to the next depending on the overall size and configuration of the light box 600. In larger implementations, it can be necessary to use super high powered LEDs for the light source 312.

Similar to the bottom light fixture 650, FIG. 6 shows that light box 600 can further include a top light fixture 660, which can further include light source 630. In an alternative implementation, the top light fixture 660 can be the only light fixture in the light box 600. Moreover, in additional example implementations, a manufacturer/designer can also position the light fixtures on the sides of the light box 600. In any event, when the light box 600 includes both a top light fixture 660 and a bottom light fixture 650, the depth of the light box 600 can be greatly reduced, while the height of the light box 600 can increase, relative to a light box 600 with only a bottom light fixture 650.

For example, in one implantation, the light box 600 can have a height of about ninety-six inches (96"), a width of about forty-eight inches (48"), and a depth of about six inches (6"). In other implementations, the dimensions of the light box 600 can vary depending on the overall configuration of the light box 600. In some implementations, the height of the light box 600 can be will over ten feet (10'). As with the previous implementations, the position of the top light fixture 660 and the bottom light fixture 650 provide an even distribution of light across the front panel 604a and back panel 604b.

A manufacturer/designer can use the light fixtures illustrated in FIG. 6, or similar light fixtures, to provide a light source within various configurations of light boxes, such as those illustrated in FIGS. 1A through 1D.

Figure 7A:
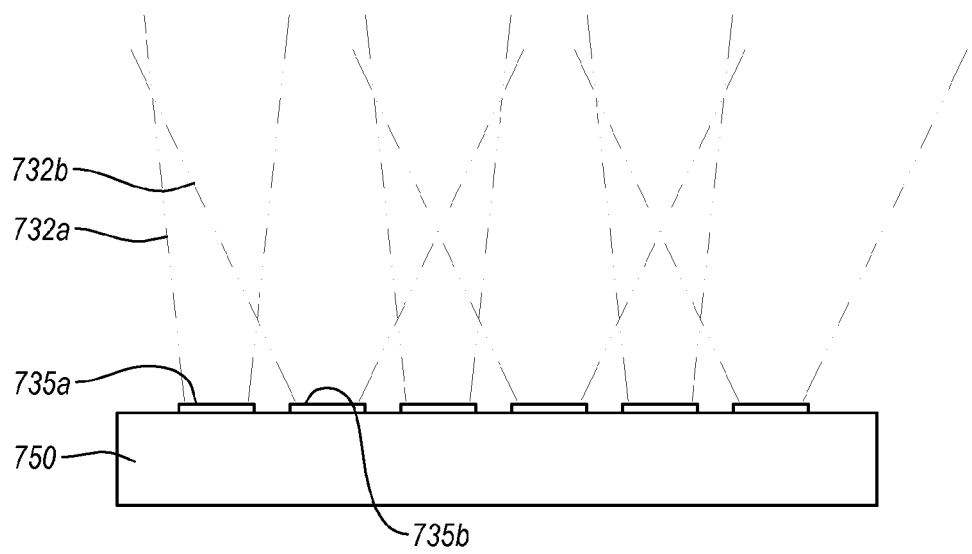
FIGS. 7A and 7B illustrate example light beam angles used in accordance with implementations of the present invention.
Figure 7B:
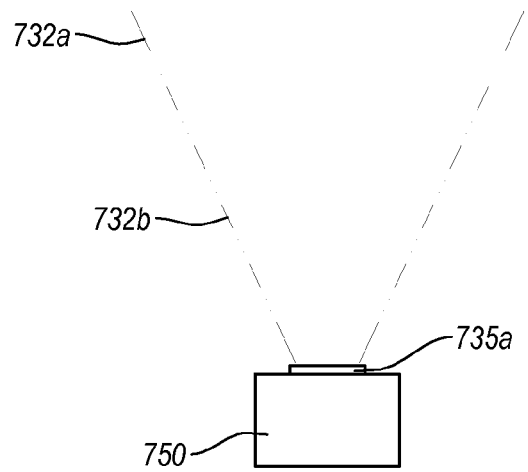

In addition to the position of the light source (e.g., plate, corner assembly, and bottom/top light fixtures) a manufacturer/designer can further control the light source and increase the uniformity of light distribution by using various optical lenses. For example, FIGS. 7A and 7B show that a manufacturer/designer can use various optical lenses with varying degrees of diffusion to effectively diffuse the light on the panel(s). In particular, FIG. 7A illustrates a light fixture 750 that includes alternating optical lenses 735a and 735b.

In one example implementation, LEDs can have an alternating lens configuration that utilizes a twenty five degree (25°) lens 735b and a six degree by twenty-five degree (6°× 25°) lens 735a, alternating on every other LED, as illustrated in FIGS. 7A and 7B. By varying the lenses, a manufacturer/designer can develop a light source that more effectively, uniformly distributes light within the small diffusion space of light boxes. In particular, for example, the lens 735a produces a first light beam 732a, while the lens 735b produces a second light beam 732b. Due to the alternating configuration of lenses 735a and 735b, the light produced from the light fixture 750 is more evenly and uniformly distributed across the panel(s).

In other example implementations, other angles of lenses and various alternative lens configurations can be used to create a uniform distribution of light on the panels, depending on the size and configuration of the light box. The following Table 1 illustrates example dimensions of light boxes and corresponding beam angles and configurations.

TABLE 1

| | Number of Fixtures | | | | | |
|---|---|---|---|---|---|---|
| | Light Fixture on One Side | | | Light Fixture on Two Sides | | |
| Height | 12"-48" | | | 48"-120" | | |
| Diffusion Space Depth | 2"-6" | 6"-12" | 12"-24" | 2"-6" | 6"-12" | 12"-24" |

TABLE 1-continued

| | Number of Fixtures | | | | | |
|---|---|---|---|---|---|---|
| | Light Fixture on One Side | | | Light Fixture on Two Sides | | |
| Beam Angle/Configuration | 6° × 25° | Alternate 6° × 25° and 25° round | Alternate 6° × 25° and open beam 118° | 6° × 25° | Alternate 6° × 25° and 25° round | Alternate 6° × 25° and open beam 118° |

One will appreciate that Table 1 represents only one example of beam angles and optic lens configurations that a manufacturer/designer can use to provide a uniform light distribution across the panels and throughout the light box. Other example beam angles include, but are not limited to, 11°, 15°, 18°, and 40°. Moreover, the light fixture 750 can include several different beam angles in the light fixture 750. For example, FIG. 7A illustrates the light fixture 750 with optic lenses 735a and 735b with two differing beam angles. In alternative implementations, the light fixture 750 can include more than two differing beam angles that a manufacturer/designer can arrange in virtually endless configurations depending on the configuration of the light box. The use of the lenses with alternating beam angles can be used for any light source, such as those described in FIGS. 4 through 6.

Figure 8:
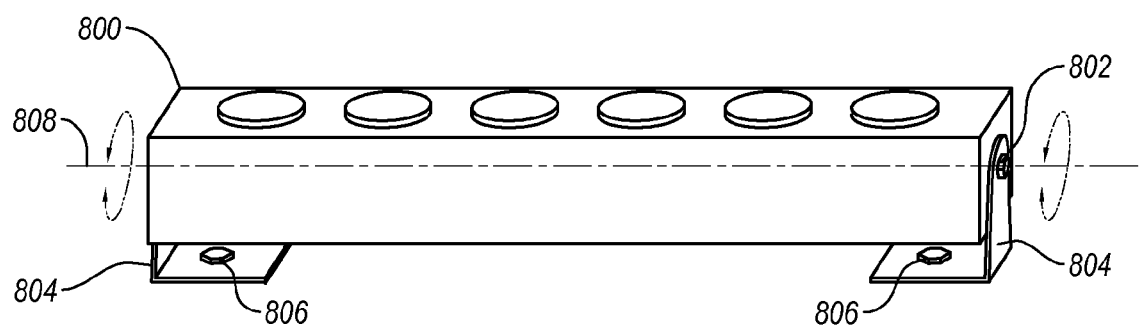
FIG. 8 illustrates an example of a rotatable light fixture in accordance with implementations of the present invention.

In addition to using optic lenses to direct light, a manufacturer/designer can also use a rotating light fixture (e.g., 800, FIG. 8) to direct light in a particular direction. For example, FIG. 8 shows that light fixture 800 can include a pin 802 located on each end of the light fixture 800. A manufacturer/designer can insert the pin 802 into a bracket 804 such that the pin 802 can rotate within the bracket 804. In addition, FIG. 8 shows that bracket 804 can further include mounting fasteners 806, which allow a manufacturer/designer to mount the bracket 804, and thus the light fixture 800, within a light box.

Once the light fixture 800 is secured within the light box, a manufacturer/designer can rotate the light fixture 800 around the axis 808 in order to direct light in any direction within the light box. In this way, the light emitted from the light fixture 800 can more effectively be distributed throughout the light box. The brackets 804, and associated hardware, is only one implementation of how the light fixture 800 can be made to rotate, and other implementations can include varying pieces of hardware to allow the light fixture to rotate.

As illustrated in FIG. 8, the brackets 804 can hold the light fixture 800 in tension between the brackets 804 such that when a manufacturer/designer rotates the light fixture 800, the light fixture remains rotated at the desired angle. In other implementations, the brackets 804 and pins 802 may have interlocking notches that hold the light fixture 800 in place when rotated.

Therefore, implementations of the present invention provide light boxes of almost endless configurations that provide uniform light distribution across the illuminated portions of the light box. In turn, the light boxes with uniform light distribution provides an aesthetically pleasing light box that a designer can use to in innumerable ways when designing or decorating a structure.

The present invention can be embodied in other specific forms without departing from its spirit or essential characteristics. Thus, the described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A uniformly illuminated light box that substantially eliminates hot spots, shadows, scalloping or other non-uniform light characteristics from the lighted panels, comprising:
   a frame;
   a translucent panel coupled to the frame, the translucent panel having an inner surface and an outer surface;
   a diffusion cavity adjacent the inner surface of the translucent panel;
   a plurality of light sources positioned within the light box; and
   a plurality of optical lenses, each optical lens of the plurality of optical lenses being operatively associated with an individual light source of the plurality of light sources, the plurality of optical lenses comprising optical lenses with at least two differing beam angles, the plurality of light sources and the plurality of optical lenses being arranged in the light box such that the optical lenses alternate between the at least two differing beam angles such that light emitted from the plurality of light sources is uniformly distributed throughout the diffusion cavity and across the translucent panel.

2. The light box as recited in claim 1, comprising a corner assembly, wherein the light source is mounted within the corner assembly and the corner assembly is coupled to an interior corner of the light box.

3. The light box as recited in claim 2, wherein the light source comprises a plurality of LEDs.

4. The light box as recited in claim 3, wherein the plurality of LEDs are operatively associated with optical lenses with differing beam angles.

5. The light box as recited in claim 1, comprising a light fixture positioned proximate an edge of the light box, the light fixture comprising the plurality of light sources, wherein the plurality of light sources comprises a plurality of LEDs.

6. The light box as recited in claim 5, wherein the light fixture is rotatable about an axis.

7. The light box as recited in claim 1, wherein the optical lenses with differing beam angles alternate between a six degree by twenty five degree lens and a twenty five degree lens.

8. The light box as recited in claim 1, wherein the optical lenses with differing beam angles alternate between a six degree by twenty five degree lens and an open beam lens of one hundred eighteen degrees.

9. The light box as recited in claim 1, wherein the optical lenses with differing beam angles includes two or more of the following angles: six degrees, six by twenty five degrees, eleven degrees, fifteen degrees, eighteen degrees, twenty five degrees, forty degrees, and one hundred eighteen degrees.

10. The light box as recited in claim 1, further comprising:
- a back plate with a reflective surface mounted to the frame opposite the translucent panel; and
- a side reflector with a reflective surface positioned along at least one wall portion on the interior of the light box.

11. The light box as recited in claim 1, wherein the translucent panel includes a diffusion layer on the inner surface of the translucent panel such that light both passes through the diffusion layer into the translucent panel while at the same time light is reflected by the diffusion layer.

12. A uniformly illuminated light box that substantially eliminates hot spots, shadows, scalloping or other non-uniform light characteristics from the lighted panels, comprising:
- a frame;
- a translucent panel coupled to the frame, the translucent panel having an inner surface and an outer surface;
- a diffusion cavity adjacent the inner surface of the translucent panel;
- a plurality of light sources positioned within the light box; and
- a plurality of optical lenses, each optical lens of the plurality of optical lenses being operatively associated with a light source of the plurality of light sources, the plurality of optical lenses comprising optical lenses with at least two differing beam angles, wherein the optical lenses with differing beam angles include two or more of the following angles: six degrees, six by twenty five degrees, eleven degrees, fifteen degrees, eighteen degrees, twenty five degrees, forty degrees, and one hundred eighteen degrees, wherein the plurality of light sources and the plurality of optical lenses are arranged in the light box such that the optical lenses alternate between the at least two differing beam angles such that light emitted from the plurality of light sources is uniformly distributed throughout the diffusion cavity and across the translucent panel.

13. The light box as recited in claim 12, wherein the translucent panel comprises a front translucent panel, and further comprising one or more additional translucent panels.

14. The light box as recited in claim 13, wherein the one or more additional translucent panels comprise at least one of an opposing back translucent panel and a side translucent panel.

* * * * *

UNITED STATES PATENT AND TRADEMARK OFFICE
CERTIFICATE OF CORRECTION

| | |
|---|---|
| PATENT NO. | : 8,419,236 B2 |
| APPLICATION NO. | : 13/262206 |
| DATED | : April 16, 2013 |
| INVENTOR(S) | : Kevin L. Fisher et al. |

Page 1 of 1

It is certified that error appears in the above-identified patent and that said Letters Patent is hereby corrected as shown below:

On the Title Page, correct item (63) as provided below:

(63) Continuation-in-part of application No. 29/355,551, filed on Feb. 9, 2010, now Pat. No. Des. 666,757, continuation-in-part of application No. 29/355,552, filed on Feb. 9, 2010, now Pat. No. Des. 676,587.

Signed and Sealed this
Ninth Day of July, 2013

Teresa Stanek Rea
*Acting Director of the United States Patent and Trademark Office*